(12) United States Patent
Leussink (10) Patent No.: US 8,644,203 B2
(45) Date of Patent: Feb. 4, 2014

(54) METHOD OF AND DEVICE FOR REDUCED POWER CONSUMPTION IN SYNCHRONIZED SYSTEMS

(75) Inventor: Steven Frederik Leussink, Utrecht (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 588 days.

(21) Appl. No.: 12/767,745

(22) Filed: Apr. 26, 2010

(65) Prior Publication Data

US 2010/0271996 A1 Oct. 28, 2010

(30) Foreign Application Priority Data

Apr. 27, 2009 (EP) .................................. 09158821

(51) Int. Cl.
*G08C 17/00* (2006.01)
*H04B 7/212* (2006.01)
*H04J 3/06* (2006.01)

(52) U.S. Cl.
USPC ........................... 370/311; 370/321; 370/350

(58) Field of Classification Search
USPC ......... 370/311, 337, 329, 347, 324, 326, 345, 370/350, 442, 503, 510; 455/265, 574, 455/343.2, 255, 257–259
See application file for complete search history.

(56) References Cited

U.S. PATENT DOCUMENTS

| 4,964,121 A | 10/1990 | Moore |
| 6,788,924 B1* | 9/2004 | Knutson et al. ............... 455/265 |
| 7,653,017 B2* | 1/2010 | Huylebroeck ................ 370/311 |
| 2002/0123374 A1 | 9/2002 | Joeressen et al. |

FOREIGN PATENT DOCUMENTS

| EP | 0726687 A | 8/1996 |
| WO | 98/58460 A | 12/1998 |
| WO | 01/33870 A | 5/2001 |

OTHER PUBLICATIONS

European Search Report and Written Opinion, in connection with European Application No. 09 15 8821, completed Sep. 18, 2009, 9 pages.

* cited by examiner

*Primary Examiner* — Hanh N Nguyen
(74) *Attorney, Agent, or Firm* — Saile Ackerman LLC; Stephen B. Ackerman; Billy Knowles (57) ABSTRACT

A power reduction method for a first communication device that can communicate with a second communication device in a synchronized fashion. The first communication device has an electronic module and the method includes generating a communication device shut down signal by the electronic module in order to shut down the communication device apart from the electronic module at a first moment in time, generating a communication device wake-up signal by the electronic module in order to switch on and start booting of the communication device at a second moment in time after the first moment in time, and generating a communication device synchronization signal by the electronic module in order to allow the communication device to restart communicating with the second communication device in the synchronized fashion at a third moment in time after the second moment in time.

15 Claims, 4 Drawing Sheets

METHOD OF AND DEVICE FOR REDUCED POWER CONSUMPTION IN SYNCHRONIZED SYSTEMS

This application claims priority under 35 U.S.C. 119(a) to European Application No. 09158821.0, entitled "Method of and device for reduced power consumption in synchronized systems," filed Apr. 27, 2009, and which application is herein incorporated by reference.

BACKGROUND OF THE INVENTION

The OSI (Open System Interconnection) model is an abstract description of a layered communication network. It divides networks into seven layers which are listed below from top to down: Application Layer, Presentation Layer, Session Layer, Transport Layer, Network Layer, Data-link Layer and Physical Layer.

One of the most important functions of the Physical Layer of the OSI model is Modulation. Here, modulation refers to a technique in which a periodic high-frequency sinusoid waveform is generated as a carrier signal which is used to convey a message. Based on a difference of carriers, modulation technology can be divided into Mono-Carrier modulation and Multi-Carrier (MC) modulation. The MC modulation is to split the transmitted data into several components and to send each of these components over separate carrier signals.

The Data-link Layer can be divided into two sub-layers: MAC (Medium Access Control) Layer and LLC (Logic Link Control) Layer. The MAC layer provides an addressing mechanism and a channel access control mechanism that can make several users connect to a multipoint network and share the capacity of a physical medium. There are three different kinds of channel access control methods: circuit mode method, packet mode method and duplex method.

One of the techniques using the circuit mode method is Time Division Multiple Access (TDMA). The aim of TDMA techniques is to maximize the number of transponders able to operate simultaneously within a certain bandwidth. TDMA allows several users to send their signals in the same frequency channel by dividing the channel into different time slots. Each user uses his own series of time slots one after another. The user only needs to listen to and broadcast in its own time slots. For the rest of the time, the user can monitor the network and detect surrounding transmitters on different frequencies.

Another technique using the circuit mode method is Frequency Division Multiple Access (FDMA). The aim of FDMA techniques is to give each user an individual allocation of one or more frequency bands which are available for the entire period of communication. Therefore, a continuous flow of data without packetizing can easily be used with FDMA.

One of the techniques using the duplex method is Time Division Duplex (TDD). The terminology "duplex" is used to describe a system composed of two parties or devices which can communicate with one another in both the uplink (UL) direction and downlink (DL) direction. Full-duplex allows communication in both directions to happen simultaneously. TDD is a kind of full-duplex method. When using the TDD method, a single frequency channel is allocated to both the transmitter and the receiver. Both the uplink (UL) and downlink (DL) traffic use the same radio frequency but at different time slots.

The DECT (Digital Enhanced Cordless Telecommunication) standard has been developed by members of European Telecommunication Standards Institute (ETSI) and aims to offer services such as cordless voice, fax, data and multimedia communications, via wireless local area networks, etc. Now, DECT has become the major standard of cordless telephone communication and is used worldwide.

DECT provides various radio access methods: Frequency Division Multiple Access (FDMA), Time Division Multiple Access, and Time Division Duplex (FDMA/TDMA/TDD). The DECT system has a total of ten possible carrier frequencies (MC) with various spectral bands depending on location. European DECT frequencies range from 1880 to 1900 MHz, Chinese DECT from 1910 to 1930 MHz, Latin America from 1920 to 1930 MHz and US DECT from 1920 to 1930 MHz. The size of a timeframe in each carrier frequency is 10 ms and each timeframe comprises 24 timeslots (TDMA). The first 12 timeslots are available for downlink transmission and the other 12 timeslots are available for uplink transmission (TDD).

Figure 1:
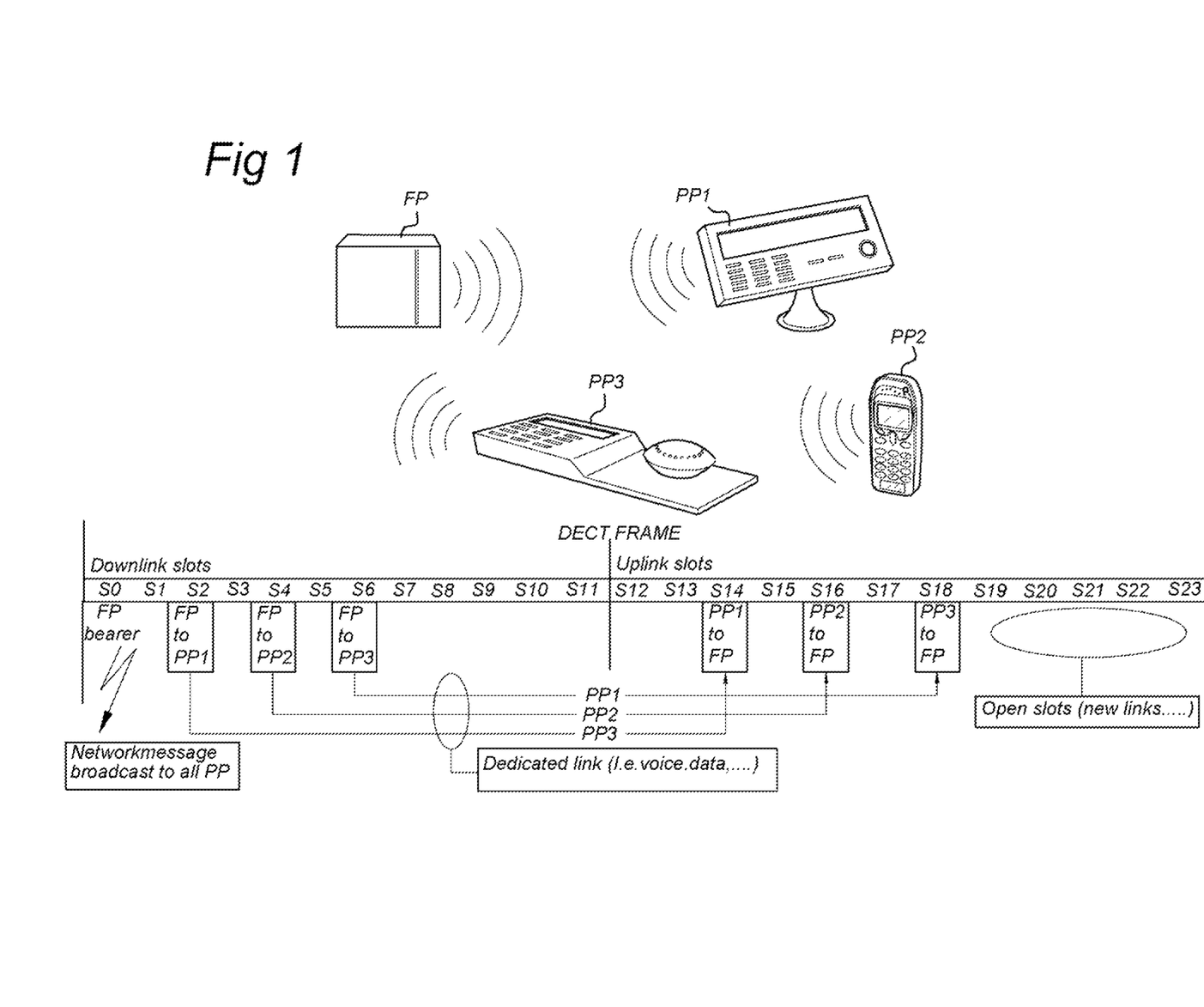
FIG. 1 is a simplified, prior art schematic view of a DECT system.

FIG. 1 shows a simplified, schematic view of a DECT system. The DECT system comprises one or more base stations, here called "fixed part" FP, a data monitor PP1 (or sensor), a cordless mobile phone PP2 and a remote controller PP3. Other types of nodes may be provided as well.

The DECT system is a micro-cell system comprising one or more base stations or Fixed Parts (FP) and one or more Portable terminals (or Portable Part (PP)). In each cell system there is a base station FP which may serve several portable terminals PP. In a TDMA system the Fixed Part FP and the Portable Part PP maintain a common time base to synchronize communication. A designated node in a TDMA system maintains a central time base to which the other nodes in the network synchronize. Each node can then be allotted a time slot to transmit as indicated in the lower part of FIG. 1. One way to do this is to let the Fixed Part FP broadcast a network message at predefined intervals and to let the other nodes listen to this message. The broadcast message is then used by various nodes or Portable Parts PP in the network to deduce timing information and also for instance which slots are available for transmission. Once the Portable Part PP successfully receives a number of broadcast messages from the Fixed Part FP the Portable Part PP can deduce the correct time base. Once the Portable Part PP time base is aligned to the time base of the Fixed Part FP the Portable Part PP is said to be synchronized to the Fixed Part FP. Once a link is successfully negotiated the Portable Part PP is assigned a downlink and uplink slot combination to communicate with the Fixed Part FP.

The lower part of FIG. 1 shows an example of how communication can take place in a DECT system. The fixed part FP broadcasts the network message, also called a bearer in a DECT system, in slot S0. In the example of FIG. 1 the Portable Parts PP1, PP2 and PP3 have negotiated a link and have been allotted different time slots to communicate with the Fixed Part FP. The Fixed Part FP first transmits data in slot S2 to the portable part PP1, then listens to a return message twelve slots later in slot S14. The Fixed Part FP then transmits data to portable part PP2 in slot S4 and listens to a return message from portable part PP2 in slot S16, etc. The bearer and negotiated links may be allotted to each slot, in a negotiated link the downlink slot number "x" is always combined with an uplink slot number "x+12" where "x" can be any number from 0 to 11. After a certain number of slots, i.e., equal to the length of a frame, each portable part has a new time slot to communicate with the fixed part FP. If all available slots are used, no new communication session with another portable part PP can be setup.

The architecture of a typical DECT Protocol is closely related to the OSI layer Structure, the table below shows equivalent functions of the OSI and DECT protocol:

| OSI model | DECT protocol |
|---|---|
| OSI Layer 3 | Network Layer (NWL) |
| OSI Layer 2 | Data Link Control Layer (DLC) |
| OSI Layer 2 | Media Access Control Layer (MAC) |
| OSI Layer 1 | Physical Layer (PHY) |

Figure 2:
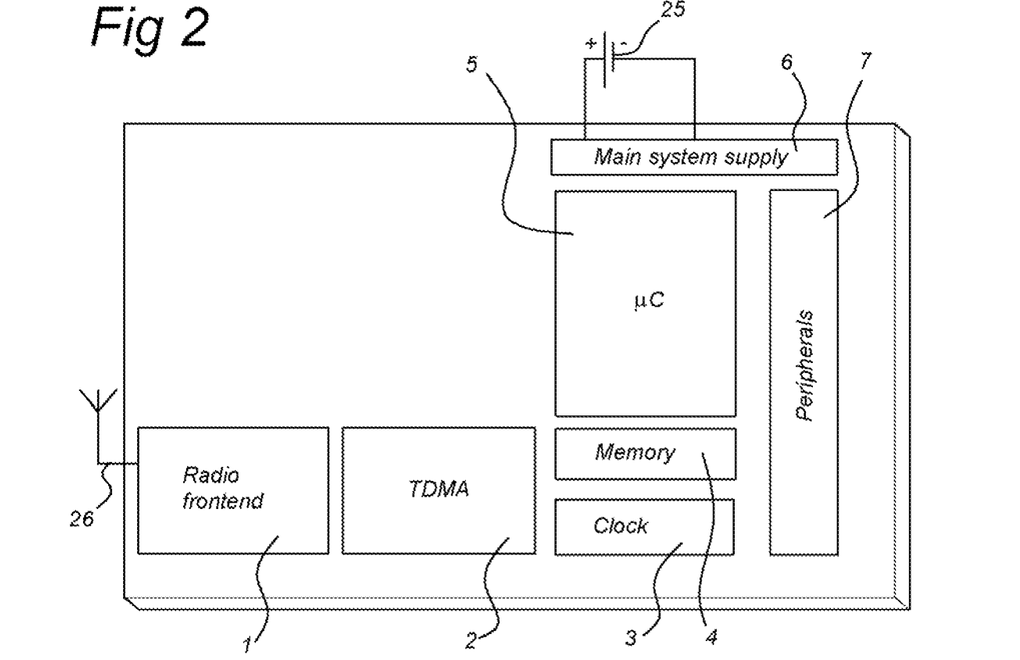
FIG. 2 is a typical prior art one-chip RF TDMA node.

As is shown in FIG. 2 of the drawing, a typical, prior art one-chip RF TDMA node contains a radio frontend 1 for RF (Radio Frequency) communication, a TDMA processor 2 for controlling the Media Access, a microprocessor (uc) 5 for running a protocol stack and controlling the system and peripherals 7, a main system supply 6 which supplies power to the whole system, a memory 4 and a clock 3. For the sake of starting data transmission on the correct moment, the time base is maintained by various timers included in said TDMA processor 2. The DECT Portable Part hardware may be implemented as follows:

A. The Radio Frontend 1 which comprises a small antenna may be operated on the PHY layer for the RF communication;

B. The TDMA processor 2 may be operated on the MAC layer, it may comprise several components like (not shown):
   A Programming Component for preparing signals to get programmed on a specific carrier and slot.
   A CRC coding component for generating CRC (cyclic redundancy checking) codes for error correction.
   A Scrambling Component for multiplying data by a predefined stream for data whitening.
   An Encryption Component for data encryption, for instance by multiplying data by a secret stream for security.

C. The microprocessor (uC) 5 runs the protocol stack, i.e. the Network Layer and higher layers, and controls the system and peripherals 7 for interfacing. It is operated on the Network Layer and higher layers, and may comprise several components (not shown):
   Voice processing component: ADPCM (ADaptive Pulse Code Modulation). It is observed that the voice processing component need not be performed by an ADPCM module but may be a subsidiary part of DSP processing component.
   DSP processing component: Digital signal processing.
   Micro controller component: Controls all the other components.

D. The clock 3 provides a single time base for the entire system.

E. Peripherals 7 may include (others may be provided too, as is known to persons skilled in the art):
   A Keypad/touch screen or other input unit
   A Microphone
   LCD (Liquid Crystal Display)
   EPROM (Electrically Programmable Read Only Memory, i.e. a permanent memory for phone book, date, clock . . . )
   Sensors.

F. The Memory 4 (temporarily) stores the data processed by microprocessor 5 or TDMA processor 2.

G. The Power Supply System 6 may be supplied by a (rechargeable) battery 25 and produces power to the whole system.

There are communication links between the Radio Frontend 1 and the TDMA processor 2, between the TDMA processor 2 and the microprocessor 5, and between the microprocessor 5 and the peripherals 7. Moreover, both the TDMA processor 2 and the microprocessor 5 are connected to memory 4. The clock 3 and the main system supply 6 are connected to all other components.

A. A. Milani, S. Sheikhaei, "Implementation of a Baseband Processor for DECT Cordless Telephone using an ADSP-2186", SHARC International DSP Conference 2001, pages 268-273 disclose a DECT system with a Power Management block monitoring activity of other blocks for reducing power consumption. To that end, the Power Management block, in the idle mode, turns off other blocks.

WO98/58460 discloses a calibrator for a mobile station of a TDMA wireless communication system such that the calibrator calibrates a low-frequency clock to a high frequency clock locked to the system timing. When the mobile station is in idle mode, the control processor of the mobile station commands the mobile station to enter into sleep mode to minimize power consumption. During sleep mode, only the calibrated low-frequency reference clock remains operating to clock the sleep logic.

At the end of the sleep period, the high-frequency clock and the TDMA timer in the mobile station are powered up. Before the TDMA timer starts up, the station takes a settling period into account to allow system components like oscillators to arrive at a stable oscillating condition. After the settling period, the mobile station automatically starts communicating with the fixed part of the network. Neither a booting action for the mobile station is disclosed nor generating a separate synchronization signal to start communicating with the fixed part of the network.

SUMMARY OF THE INVENTION

The object of the invention is to provide a DECT node with reduced power consumption.

To that end, the invention provides an electronic module for a first communication device, the first communication device comprising at least one processor arranged to communicate with a second communication device in a synchronized fashion, i.e. in allocated slots in consecutive frames, the electronic module comprising an electronic module timer which is arranged to be calibrated by the at least one processor, the electronic module being arranged to:
   a. generate a communication device shut down signal in order to shut down the communication device apart from the electronic module at a first moment in time,
   b. generate a communication device wake-up signal in order to switch on and start booting of the communication device at a second moment in time after the first moment in time, and
   c. generate a communication device synchronization signal at a third moment in time after the second moment in time in order to allow the communication device to restart communicating with the second communication device in the synchronized fashion, i.e. in the allocated slots.

So, the device as claimed comprises a separate block which turns on/off the whole system periodically and synchronizes with the TDMA processor in the device in order to reduce power consumption. At the same time, it eliminates synchronous radio transmission timing issues with the base station in the network, related to variability in device startup latency.

The invention also relates to a communication device comprising at least one processor arranged to communicate with a further communication device in a synchronized fashion, i.e. in allocated slots in consecutive frames, the communication device also comprising an electronic module comprising an electronic module timer which is arranged to be calibrated by the at least one processor, the electronic module being arranged to:

a. generate a communication device shut down signal in order to shut down the communication device apart from the electronic module at a first moment in time, b. generate a communication device wake-up signal in order to switch on and start booting of the communication device at a second moment in time after the first moment in time, and c. generate a communication device synchronization signal at a third moment in time after the second moment in time in order to allow the communication device to restart communicating with the second communication device in the synchronized fashion, i.e. in the allocated slots.

Moreover, the invention relates to a telecommunication network comprising one or more such communication devices and a further communication device arranged to communicate with the one or more communication devices in a synchronized fashion, i.e. in allocated slots in consecutive frames.

Finally, the invention relates to a power reduction method in a first communication device arranged to communicate with a second communication device in a synchronized fashion, i.e. in allocated slots in consecutive frames, the method comprising a. providing an electronic module for the first communication device, b. generating a communication device shut down signal by the electronic module in order to shut down the communication device apart from the electronic module at a first moment in time, c. generating a communication device wake-up signal by the electronic module in order to switch on and start booting of the communication device at a second moment in time after the first moment in time, and d. generating a communication device synchronization signal by the electronic module at a third moment in time after the second moment in time in order to allow the communication device to restart communicating with the second communication device in the synchronized fashion, i.e. in the allocated slots.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

The drawings show.

DETAILED DESCRIPTION OF EMBODIMENTS

Figure 3:
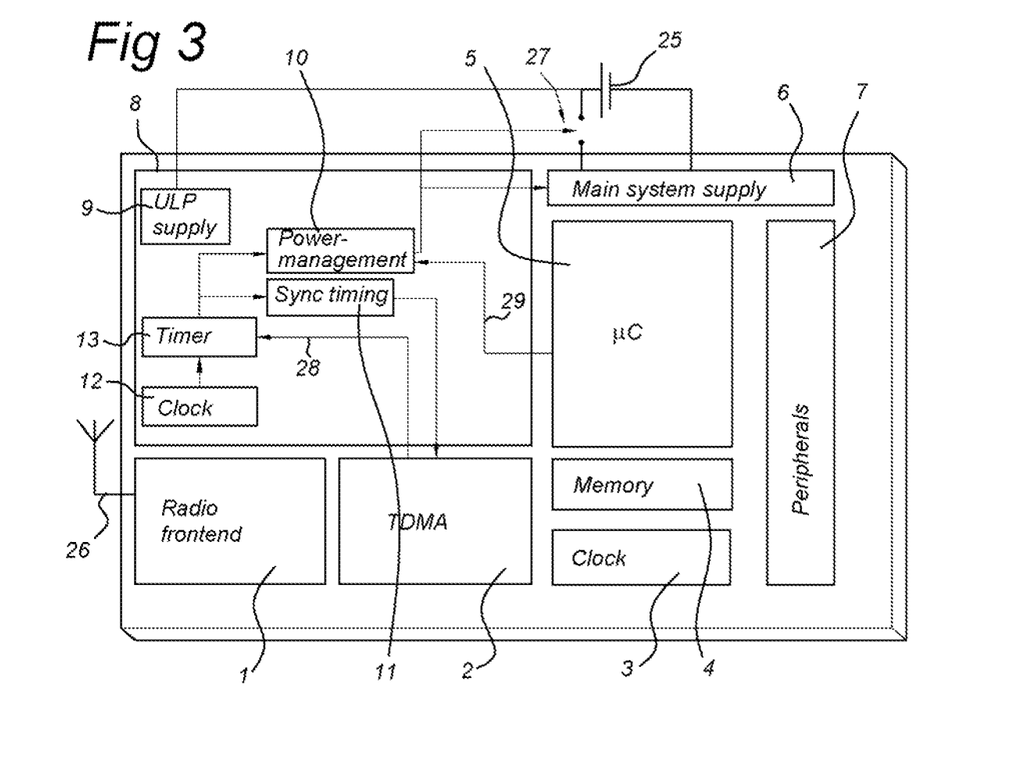
FIG. 3 is an example of an one-chip RF TDMA node with Ultra Low Power (ULP) block according to the invention.

In order to achieve low power consumption in a Portable Part PP, system blocks are usually switched off when the system does not transmit or receive any information, i.e. when the system is idle. As will be explained in detail below, a further power reduction can be achieved via a shut down of the entire Portable Part PP while it is not transmitting or receiving data. In order to allow such a shut down, measures have to be taken to maintain synchronization between the Portable Part PP and the Fixed Part FP. As is shown in FIG. 3, an Ultra Low Power (ULP) block 8 is introduced into the Portable Part PP which maintains a time base while the Portable Part PP is idle and controls this process of synchronization. Here, synchronization refers to time synchronized communication between two communication devices communicating with one another during fixed, allocated time slots in consecutive time frames during a communication session. Both communication devices have respective controllers to control that the communication occurs exactly within the allocated time slots.

In FIG. 3, all blocks and connections that have the same reference signs as in FIG. 2 have the same meaning: a Radio Frontend 1 for RF (Radio Frequency) communication, a TDMA processor 2 for controlling the Media Access, a microprocessor (uc) 5 for running a protocol stack and controlling the Portable Part PP and peripherals 7, a main system supply 6 which supplies power to the whole Portable Part PP, a memory 4 and a clock 3. The microprocessor 5 is operating as master in its communications with the TDMA processor 2, which acts as a slave. The interconnections are the same as explained with reference to FIG. 2. For the sake of starting data transmission by the Portable Part PP on the correct moment, a time base is maintained by various timers included in said TDMA processor 2. The blocks Radio Frontend 1, TDMA processor 2, microprocessor 5 and peripherals 7 may comprise the same components as explained with reference to the prior art of FIG. 2. However, the functionality of such components may be implemented in any way known to persons skilled in the art, including any software, digital or analogue implementation and any combination thereof.

The ULP block 8 of the Portable Part PP is connected to the TDMA processor 2, the main system supply 6 and a switch 27 which connects the main system supply 6 to battery 25. The switch 27 can be implemented as internal switch or as external switch or as any decoupling mechanism. The ULP block 8 may be implemented in many different ways ranging from a software implementation to a processor based on digital techniques or any combination thereof. However, an analogue implementation is not to be excluded either.

FIG. 3 shows one implementation. The peripheral 7 comprises a microphone (not shown) which is connected to microprocessor 5 in order to transmit user's voice to the voice processor component which is inside of said microprocessor 5. The microprocessor 5 transmits processed data packets from said microprocessor 5 to said TDMA processor 2. The TDMA processor 2 transmits encrypted and scrambled data packets to Radio Frontend 1 after which the Radio Frontend sends these data packets to the Fixed Part FP via antenna 26. The micro controller component which is inside of said microprocessor 5 is connected to said peripherals 7 in order to control all the data flows generated by the said peripherals 7. Both the microprocessor 5 and the TDMA processor 2 are connected to the memory 4 in order to store and read raw data during the data packets processing. Again, clock 3 is connected to all other components (i.e., the blocks indicated with 1, 2, 4, 5, 6, and 7) except to ULP block 8. The main system supply 6 is connected to all the other components except said ULP block 8 in order to supply electrical power.

The ULP block 8 comprises its own ULP power supply 9 which is connected to all the components inside of said ULP block 8 to produce power to ULP block 8. The ULP power supply 9 is connected to battery 25. However, it may receive its power from another distinct battery if desired. An ULP clock 12 is connected to an ULP timer 13 which is connected to all components inside of said ULP block 8 in order to generate critical timing interrupts for the ULP block 8, as well as for the TDMA processor 2. In an embodiment, the TDMA processor 2 has a direct link 28 to the ULP timer 13. Thus, the internal timer(s) of the TDMA processor 2, as controlled by microprocessor 5, can generate suitable timing signals to the ULP timer 13 in order to calibrate the ULP block 8 to the time base in the TDMA processor 2. In this way, the ULP timer 13 is able to generate suitable timing signals to allow the ULP block 8 to operate as required as will be explained below.

Moreover, the microprocessor 5 may be connected (not shown) to the ULP block 8 to control ULP block 8, for instance by suitable enable signals, disable signals, mode signals, etc.

Thus, in the embodiment shown in FIG. 3, there are two processors, i.e. the microprocessor 5 and TDMA processor 2, however, there may be less or more processors performing the combined functionality of these two processors as required in the communication with ULP block 8.

In the embodiment shown, the ULP block 8 comprises a sync timing block 11 and a power management block 10 which are both connected to ULP timer 13. The ULP timer 13 is arranged to provide precise time signals for both sync timing block 11 and power management block 10. The power management block 10 is connected to microprocessor 5 via a link 29. The sync timing block 11 connects to TDMA processor 2 in order to generate a synchronization signal that is used by the TDMA processor 2 to synchronize with the Fixed Part FP, as will be explained in detail below. The synchronization signal produced by sync timing block 11 provides the system with a preprogrammed time reference, i.e. time base, in order to start synchronous transmission. The power management block 10 is connected to power supply system 6 in order to generate a power down/on signal to switch the system in/from deep power down mode (on/off) during its idle state for as long as the timing accuracy in the ULP block 8 allows.

Figure 4:
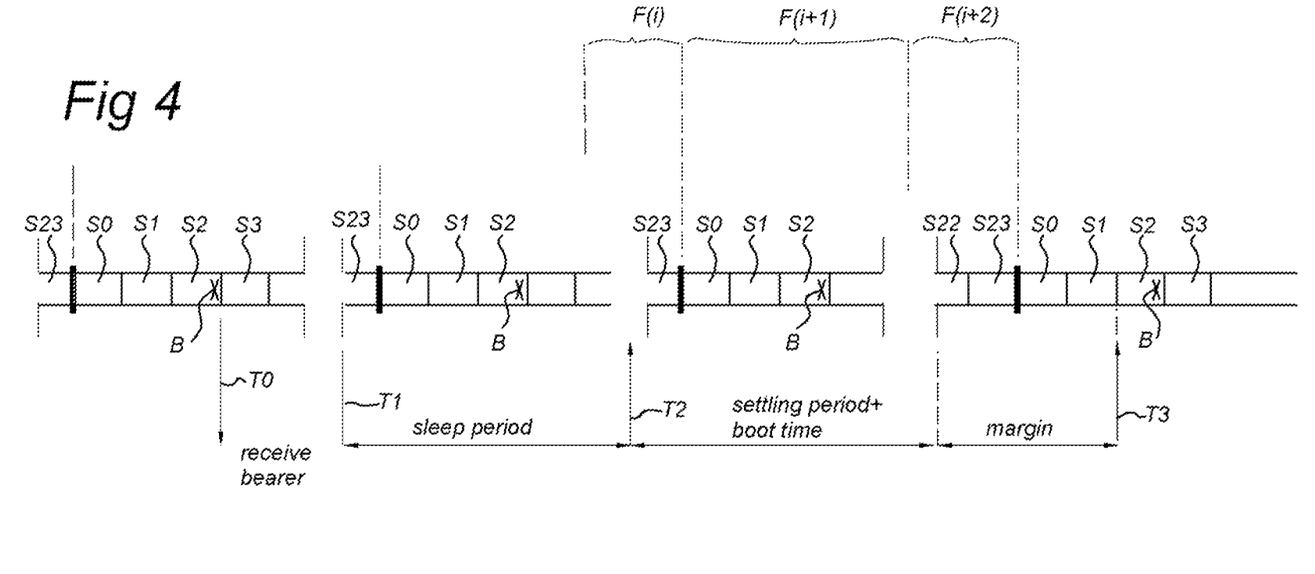
FIG. 4 is a diagram showing actions of an exemplary ULP block in time relative to timing of a Fixed Part in the DECT system.
Figure 5:
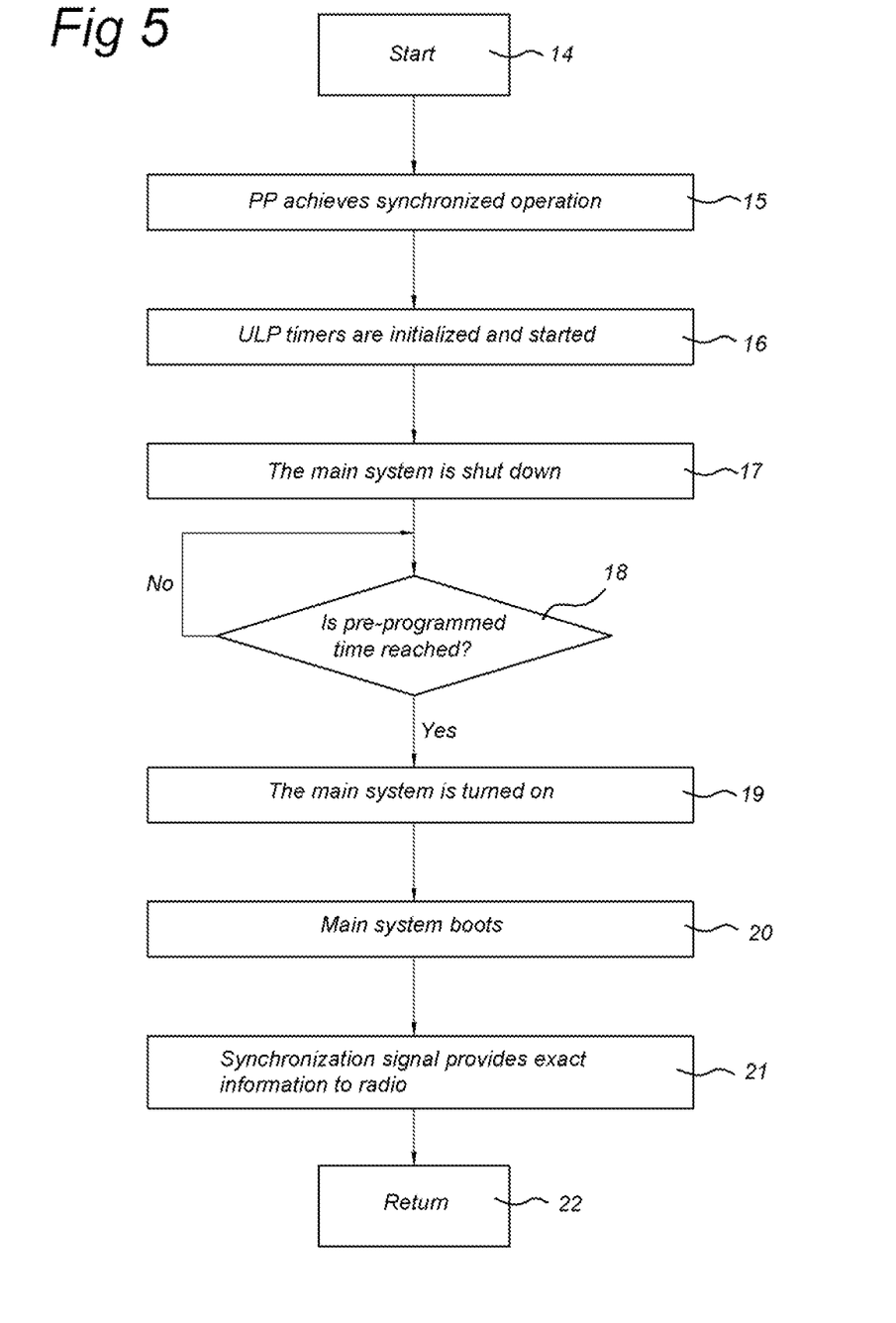
FIG. 5 is a flow chart of the operation of an exemplary ULP block.

FIGS. 4 and 5 illustrate the operation of the ULP block 8 in more detail. As an example suppose the following:

DECT uses a TDMA data frame consisting of 24 consecutive slots (slot S0, slot S1, slot S2 and so forth up to slot S23) as indicated in FIG. 1. The Fixed Part FP is arranged to broadcast a bearer B in a predefined TDMA slot to Portable Parts PP within its radio cell on a periodic basis (i.e., once per frame). In FIG. 4 it is assumed that the bearer B is broadcasted in slot S2, however, the invention is not restricted to this example.

In action 14, the Portable Part PP concerned starts operating. The Portable Part PP scans the DECT radio spectrum and searches for the Fixed Part FP bearer B. The Portable Part PP synchronizes to the bearer B in slot S2 (for instance). Every time when receiving the bearer B correctly in slot S2, the Portable Part PP knows it is still synchronized with the Fixed Part FP.

Microprocessor 5 determines the length of the calibration cycle to calibrate the ULP timer 13 to the internal timing of the system. The start and stop points of the calibration are independently defined by a certain slot number S(n) in a certain frame number F(p) in a certain Multiframe M(q) number, where n can be in the range of 0 to 11 (i.e. 12 downlink slots in a frame), p can be in the range of 0 to 15 (i.e. 16 Frames in a Multiframe) and q can be in the range of 0 to 255 (256 Multiframes in a Superframe). In DECT, the length of a Slot is around 416 microseconds, the length of a Frame is 10 milliseconds, the length of a Multiframe is 160 milliseconds and the length of a Superframe is 40.96 seconds. As an example, assume the calibration time needs to be 20.48 seconds in total. The start point could be defined as slot S2, frame F0 and Multiframe M0. The end point is then defined as slot S2, frame F0 and Multiframe M127. The invention is not limited to this specific TDMA framing structure and for reasons of simplicity the example shown in FIGS. 4 and 5 are limited to Slot and Frame numbers. After the TDMA processor 2 of the Portable Part PP has received the bearer B broadcasted in said slot S2 from Fixed Part FP, microprocessor 5 initiates a calibration cycle in the first frame of the calibration in which the TDMA processor 2 sends a timer start and stop signal to ULP timer 13 via link 28, action 16. The stop signal is used to accurately finish the calibration cycle after receiving the bearer B broadcasted in said slot S2 in the last frame of the calibration. The ULP timer 13 uses this timer start and stop signal to calibrate its internal timing with the timing of the rest of the system. Assume proper reception of a bearer B in a given slot S2 at time T0 (cf. FIG. 4). Then a time T3 can be calculated for a given period between T0 receiving a bearer B in said slot S2 and said time T3 receiving a bearer B in a slot S2 a given number of frames later. The proper calibration of ULP timer 13 ensures the time base of the Portable Part PP is accurate enough to allow for reception of the bearer at time T3. The allowable time between times T0 and T3 is determined by the period in which the system does not need to receive or transmit data. This period will be referred to as the Radio Frequency RF inactive period. As an example, this period may be several seconds long in practice. At time T3, the portable part PP can start communicating with the fixed part FP again. However, to be able to do so at time T3, the portable part PP must have had some time for settling some internal components like oscillators and for software booting. Say, such settling and booting should take place at a time T2, then time T2 is determined by subtracting the time required for (e.g.) oscillator settling, software booting and a required margin due to variation in time of the settling and boot process from time T3. Before T2 and after T0 the microprocessor 5 can instruct the ULP block 8 to start a shut down (or sleeping) session. This is schematically indicated to occur at time T1, where time T1 may be initiated at any time before T2 and after T0. In such a shut down session, the ULP block 8, by means of power management block 10, will generate a suitable shut down signal.

To start shut down, the microprocessor 5 commands power management block 10 to generate a power down signal by means of an instruction signal to that effect via link 29. The power management block 10 generates the shut off signal for switch 27 and main system supply 6. Switch 27 opens and the main system supply 6 stops operating, action 17.

Then, the power management block 10 receives a power up signal from ULP timer 13 at the predetermined time T2 to wake up the system again, action 18. In the arrangement shown in FIG. 4, this time period between T1 and T2 (the shut down period) may, e.g., last several frame periods (for instance several seconds).

After having received the power up signal from timer 13, the power management block 10 generates the wake-up signal and sends this signal to both the switch 27 and the main system supply 6. Upon receiving the wake-up signal the switch 27 closes again such that the main system supply 6 receives power from battery 25 and the main system supply 6 is turned on, action 19. Then, action 20, the microprocessor 5 first starts a settling period and then a system booting operation. During the settling period, several system components get the chance to obtain their stable operating conditions. For instance, oscillators within timers will not directly start with stable well-defined output signals but they will obtain a stable desired output signal within the settling period. After these components have been settled, the microprocessor 5 starts the system booting operation. The system booting operation finishes after a certain time period which may last between one and two frames periods. In FIG. 4, this has been indicated such that the settling period starts at time T2 in a certain frame F(i) and together with the boot time it may end in a frame F(i+2). However, the invention is not restricted to this example. If required the time period may last longer. In an example, it lasts up to 30 ms. The exact time of the booting operation is unpredictable and depends on start-up phenomena, including random software delays, RC circuit reset delays, etc. However, the time of the booting operation will be within a known booting operation time period, for instance, the time may be shorter than two times a frame period.

The sync timing block 11 is arranged to produce a system synchronization signal at time T3 after the beginning of the Radio Frequency RF inactive period T0, as defined above, action 21. This system synchronization signal is sent to TDMA processor 2 which uses this synchronization signal to start communicating with the Fixed Part FP in order to receive a second bearer in a second slot S2. This second bearer contains control information and data from the fixed part FP and can be used to verify the Portable Part PP time base with respect to the Fixed Part FP time base. In an embodiment, each portable part PP is associated with a bearer signal in a certain slot, e.g. slot S2, in a predefined Frame and Multiframe. For instance, a fixed part FP may be arranged to communicate with a maximum of, say, ten portable parts PP. Then, ten consecutive Frames are each associated with a bearer in slot S2 in these ten different portable parts PP. This will be true for the next ten Frames in the next Multiframe, etc. Then, it is important that the system synchronization signal is produced by sync timing block 11 for TDMA processor 2 at such a moment in time that it is certain that the first time slot to be received by the Portable Part PP from the Fixed Part FP is a slot S2 in a predefined Frame and Multiframe associated with the portable part PP concerned. This can be done provided time T3 is accurate enough. This time T3 depends on the accuracy of the ULP clock 12 and the timing accuracies of the ULP timer 13, the sync timing block 11 and the power management block 10. Moreover, the time interval between the settling period/system wake-up signal time T2 and the system synchronization signal time T3 should be bigger than the total start up phenomena cost, i.e. random software delay, random RC circuit reset delay, etc, in order to eliminate the unpredictable start up phenomena as a barrier to synchronization. In FIG. 4, this has been indicated with the term "margin".

Upon receiving the bearer in said slot S2, the Portable Part PP is still synchronous with respect to the Fixed Part FP as the time bases are still aligned. In an embodiment, the Portable Part PP can measure timing offsets when receiving a bearer in said slot S2 with respect to time T3 to correct for drift effects in ULP clock 12 to ensure the Portable Part PP time base remains aligned to the Fixed Part FP time base.

The Portable Part PP may repeat sleeping, i.e. shut down completely, and waking up, i.e. settle and boot the system, iteratively after having received data in a predetermined number of slots S2. This predetermined number of slots may range from one and more. Each time, the same procedures as explained above may be used to that effect. When repeating sleeping, the calibration of timers may not have to be repeated as the timers of the Portable Part PP will still be aligned to the time base of the Fixed Part FP with sufficient accuracy.

The average sleeping time for a normal DECT device is preferably at maximum 640 ms. However, the average sleeping time for other specific devices such as a thermal sensor may be as large as 20 seconds since it does not need to respond to a broadcasted network message (bearer) from Fixed Part FP within a limited amount of time. As an example, a regular DECT Portable Part PP may be paged due to an incoming call on the Fixed Part FP, to which it should respond within for instance 640 ms.

Normally, the total start up phenomena time period including software delay and hardware delay is less than 30 ms.

The ULP block 8 can be implemented in various ways and it can comprise more components that provide more functionalities.

It is also observed that the invention is applicable in general where a first communication device is arranged to communicate with a second communication device in a synchronized fashion, i.e. in allocated slots in consecutive frames. The first communication device has an electronic module comprising an electronic module timer which is arranged to be calibrated by a processor of the first communication device. Then, basically the electronic module performs the following actions:

a. generate a communication device shut down signal in order to shut down said communication device apart from said electronic module at a first moment in time, b. generate a communication device wake-up signal in order to switch on and start booting of said communication device at a second moment in time after said first moment in time, and c. generate a communication device synchronization signal at a third moment in time after the second moment in time in order to allow said communication device to restart communicating with said second communication device in said synchronized fashion.

In the example explained above, action 16 is the first moment in time, action 19 is the second moment in time, and action 21 is the third moment in time.

Where the second communication device is a base station that is arranged to set up a connection with the first communication device to establish a communication channel between the first communication device and a calling device, the time difference between the first moment in time and third moment in time should be shorter or equal to a maximum allowable response time of the first communication device. Such a maximum allowable response time can be defined by a Standard.

Preferably, the difference between the second moment in time and third moment in time is larger than a predetermined booting time of said first communication device.

The invention claimed is:

1. An electronic module for a first communication device, the first communication device comprising at least one processor arranged to communicate with a second communication device in a synchronously by way of allocated slots in consecutive frames, the electronic module comprising an electronic module timer which is arranged to be calibrated by said at least one processor, the electronic module being arranged to:

generate a communication device shut down signal in order to shut down said first communication device apart from said electronic module at a first moment in time;

generate a communication device wake-up signal in order to switch on and start booting of said first communication device at a second moment in time after said first moment in time; and     generate a communication device synchronization signal at a third moment in time after said second moment in time in order to allow said first communication device to restart communicating with said second communication device in said synchronously by way of said allocated time slots;

wherein the difference between the second moment in time and third moment in time is larger than a predetermined booting time of said first communication device.

2. The electronic module according to claim 1, wherein the electronic module comprises a first timing unit connected to said electronic module timer and arranged to generate said communication device shut down signal at said first moment in time and to generate said communication device wake-up signal at said second moment in time in dependence on signals received from said electronic module timer.

3. The electronic module according to claim 1, wherein the electronic module comprises a second timing unit connected to said electronic module timer and arranged to generate said communication device synchronization signal.

4. The electronic module according to claim 1, wherein the first communication device synchronizes to the second communication device by synchronizing to a bearer transmitted by said second communication device in predetermined slots in predetermined frames, said predetermined slots being associated with said first communication device, the third moment in time being equal to a time such that the next received slot is one of said predetermined slots associated with the first communication device to allow said first communication device to receive a further bearer in said next received slot which is located a given number of frames after having properly received a last bearer in a first slot at a time before said first moment in time, the second moment in time being determined by subtracting a time period from the third moment in time, said time period being equal to a time required for said booting and for settling system components and a time margin for unpredictable start up phenomena.

5. A first communication device comprising at least one processor arranged to communicate with a second communication device synchronously by way of allocated slots in consecutive frames, the first communication device also comprising an electronic module comprising an electronic module timer which is arranged to be calibrated by said at least one processor, the electronic module being arranged to:

a. generate a communication device shut down signal in order to shut down said first communication device apart from said electronic module at a first moment in time,     b. generate a communication device wake-up signal in order to switch on and start booting of said first communication device at a second moment in time after said first moment in time, and     c. generate a communication device synchronization signal at a third moment in time after said second moment in time in order to allow said first communication device to restart communicating with said further communication device in synchronously by way of said allocated slots,     wherein the difference between the second moment in time and third moment in time is larger than a predetermined booting time of said first communication device.

6. The communication device according to claim 5, wherein the first communication device synchronizes to the second communication device by synchronizing to a bearer transmitted by said second communication device in predetermined slots in predetermined frames, said predetermined slots being associated with said first communication device, the third moment in time being equal to a time such that the next received slot is one of said predetermined slots associated with the first communication device to allow said first communication device to receive a further bearer in said next received slot which is located a given number of frames after having properly received a last bearer in a first slot at a time before said first moment in time, the second moment in time being determined by subtracting a time period from the third moment in time, said time period being equal to a time required for said booting and for settling system components and a time margin for unpredictable start up phenomena.

7. The first communication device according to claim 5, wherein said first communication device is arranged to allow several system components of said communication device to obtain stable operating conditions during a settling time before said booting starts.

8. The first communication device according to claim 5, said at least one processor comprising a microprocessor and a TDMA processor which are arranged to calibrate said electronic module timer.

9. The first communication device according to claim 8, wherein the electronic module is arranged to send the communication device synchronization signal to said TDMA processor which is arranged to use said synchronization signal to restart communicating with said second communication device in order to synchronize with said second communication device.

10. The first communication device according to any of the claim 5, the first communication device being arranged as being one of a portable part and a sensor.

11. The first communication device according to any of the claim 5, the first communication device being a wireless DECT telephone.

12. A telecommunication network comprising one at least one first communication device as defined in claim 5, and a second communication device arranged to communicate with said one or more communication devices in a synchronously by way of allocated slots in consecutive frames.

13. A power reduction method in a first communication device arranged to communicate with a second communication device synchronously by way of allocated slots in consecutive frames, the method comprising the steps of:

a. providing an electronic module for said first communication device;

b. generating a communication device shut down signal by said electronic module in order to shut down said first communication device apart from said electronic module at a first moment in time;

c. generating a communication device wake-up signal by said electronic module in order to switch on and start booting of said first communication device at a second moment in time after said first moment in time; and     d. generating a communication device synchronization signal by said electronic module at a third moment in time after said second moment in time in order to allow said first communication device to restart communicating with said second communication device in synchronously by way of said allocated slots;

e. determining the second moment in time by the step of: subtracting a time period from the third moment in time, said time period being equal to a time required for said booting and for settling system components and a time margin for unpredictable start up phenomena.

14. The method according to claim 13, further comprising the step of:

f. synchronizing the first communication device to the second communication device by synchronizing to a bearer transmitted by said second communication device in predetermined slots in predetermined frames, said predetermined slots being associated with said first communication device, the third moment in time being equal to a time such that the next received slot is one of said predetermined slots associated with the first communication device to allow said first communication device to receive a further bearer in said next received slot which is located a given number of frames after having properly received a last bearer in a first slot at a time before said first moment in time.

15. An electronic module for a first communication device, the first communication device comprising at least one processor arranged to communicate with a second communication device in a synchronized fashion by way of allocated slots in consecutive frames, the electronic module comprising an electronic module timer which is arranged to be calibrated by said at least one processor, the electronic module being arranged to:

a. generate a communication device shut down signal in order to shut down said first communication device apart from said electronic module at a first moment in time, b. generate a communication device wake-up signal in order to switch on and start booting of said first communication device at a second moment in time after said first moment in time, and c. generate a communication device synchronization signal at a third moment in time after said second moment in time in order to allow said first communication device to restart communicating with said second communication device in said synchronized fashion by means of said allocated time slots, wherein the difference between the first moment in time and third moment in time is shorter or equal to a maximum allowable response time of said first communication device.

* * * * *